Sept. 6, 1938. L. J. PERRIN 2,129,234
BACON RINDER
Original Filed Jan. 19, 1929
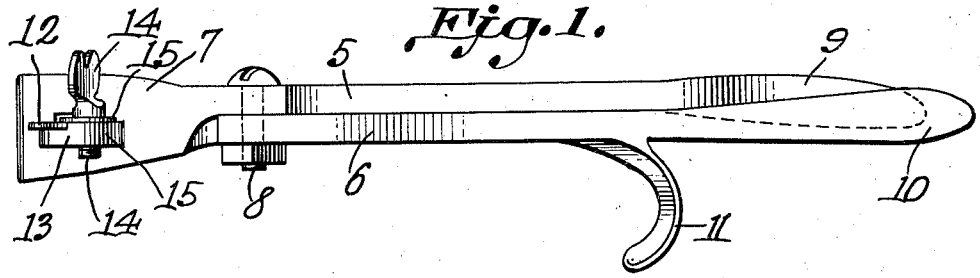
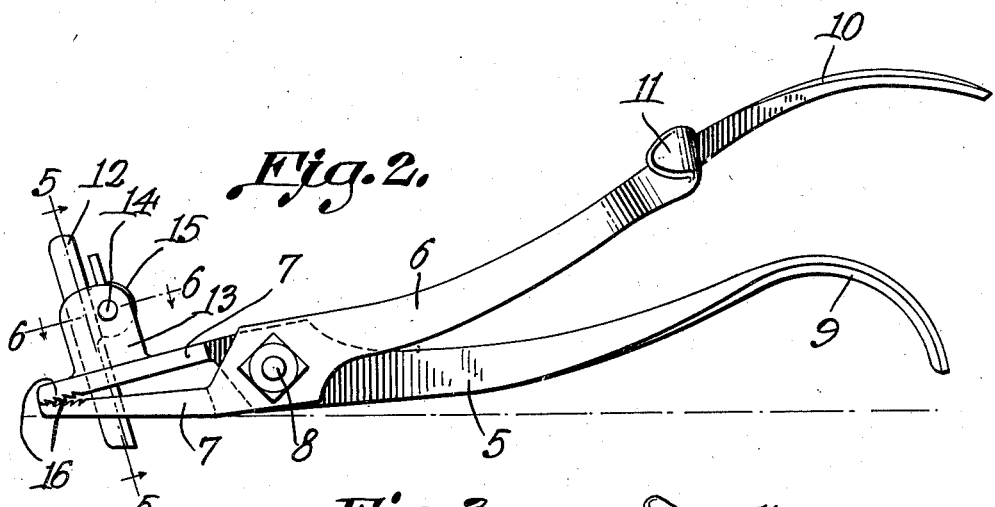
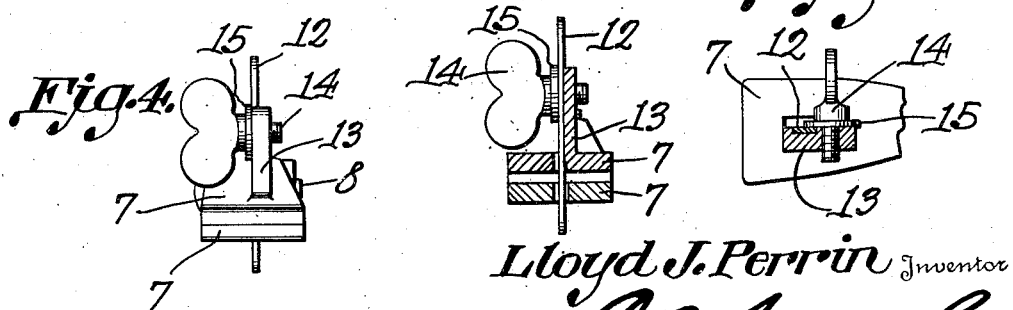

Patented Sept. 6, 1938

2,129,234

UNITED STATES PATENT OFFICE 2,129,234

BACON RINDER

Lloyd J. Perrin, Casper, Wyo., assignor to Oran Heath, Casper, Wyo.

Refiled for abandoned application Serial No. 333,681, January 19, 1929. This application March 2, 1938, Serial No. 193,592

1 Claim. (Cl. 146—130)

This invention relates to a device designed for use in removing bacon rinds from slabs of bacon, the primary object of the invention being to provide a device that will remove the rind with the minimum amount of waste, and with comparatively little exertion on the part of the operator.

Another object of the invention is to provide an implement having wide jaws, and a blade extending through the jaws, the width of the jaws being such that a broad surface is presented to rest on the bacon slab and hold the implement against twisting while in use.

A still further object of the invention is to provide an adjustable blade which may be adjusted with respect to the jaws so that it may be used for cutting rinds of various thicknesses.

With the foregoing and other objects in view which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a plan view of an implement constructed in accordance with the invention.

Figure 2 is a side elevational view thereof.

Figure 3 is a bottom plan view of the implement.

Figure 4 is an end elevational view thereof.

Figure 5 is a sectional view taken on line 5—5 of Figure 2.

Figure 6 is a sectional view taken on line 6—6 of Figure 2.

Referring to the drawing in detail, the implement comprises pivotally connected members 5 and 6 respectively each of which being provided with a jaw 7, the jaw being substantially wide and flat, as clearly shown by Figure 1.

The reference character 8 designates a bolt which extends through the members 5 and 6 at a point adjacent to the jaws thereof. Each of the members 5 and 6 is provided with a handle, the handle of the member 5 being curved downwardly as at 9, while the handle of the member 6 is spaced above the handle portion 9 and slightly curved as at 10, there being provided a laterally curved extension 11 providing a thumb piece to be engaged by the thumb of the operator so that the implement may be conveniently operated.

Formed in the jaws 7 are elongated aligning openings, which openings accommodate the blade 12 that has its inner edge beveled to provide a cutting edge so that the blade may be moved along a slab of bacon by a pulling action directed to the implement by the operator. Formed integral with the uppermost jaw 7 and arranged adjacent to the opening thereof, is an upstanding blade support 13 which is formed with a recess for the reception of the blade 12.

Cooperating with the blade 12 is a winged screw 14 that has a circular flange 15 that overlies a portion of the blade 12 and acts to grip the blade 12 and force it into the recess of the blade support 13 to the end that the blade may be moved to various positions of adjustment so that various lengths of the blade may be extended beyond the jaws of the tool to cut rinds of various thicknesses, and to cut the rind from the bacon slab at one end of the slab, it being obvious that for the latter operation a greater length of blade is necessary.

Teeth 16 are formed along the inner surface of the jaw and bite into the bacon rind to grip the bacon rind when it is desired to strip the rind from the bacon slab.

In the use of the device the blade 12 is extended an appreciable distance beyond the lowermost jaw of the implement where it is secured in position by means of the set screw 14. The implement is now placed against one end of the slab and the blade positioned directly under the rind, the implement being drawn across the end of the slab cutting the rind from the bacon at one end of the slab. The blade is now adjusted so that a length of the blade is exposed which is equal to the thickness of the rind, and the implement is now drawn along the rind longitudinally thereof forming spaced cuts throughout the entire width of the bacon slab.

With the rind cut in sections as described, the end of the rind is gripped between the jaws of the implement and the implement is pulled, causing the rind to separate from the bacon in strips.

This application is a substitute for application No. 333,681, filed January 19, 1929.

I claim:

An implement for removing the rind of bacon, including pivotally connected members having handles, substantially wide flat jaws formed on the members, said jaws having openings disposed centrally thereof, a vertically adjustable blade supported on one of the jaws and extending through the opening of the opposite jaw, the openings of the jaws being larger than the blade to allow the blade to move therethrough, and one of the wide flat jaws adapted to guide the implement along the edge of the bacon under treatment.

LLOYD J. PERRIN.